(12) United States Patent
Suzuki

(10) Patent No.: US 9,906,910 B2
(45) Date of Patent: Feb. 27, 2018

(54) COMMUNICATION SYSTEM, CONTENTS ACQUISITION METHOD, AND RECORDING MEDIUM STORING CONTENTS ACQUISITION PROGRAM

(71) Applicant: Koji Suzuki, Kanagawa (JP)

(72) Inventor: Koji Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/332,058

(22) Filed: Oct. 24, 2016

(65) Prior Publication Data
US 2017/0127236 A1 May 4, 2017

(30) Foreign Application Priority Data

Oct. 30, 2015 (JP) ................................. 2015-214899

(51) Int. Cl.
*H04W 4/02* (2018.01)
*G01S 5/02* (2010.01)
(Continued)

(52) U.S. Cl.
CPC .......... *H04W 4/023* (2013.01); *G01S 5/0242* (2013.01); *G01S 5/0284* (2013.01);
(Continued)

(58) Field of Classification Search
None
See application file for complete search history.

(56) References Cited

U.S. PATENT DOCUMENTS

| 2006/0190535 A1* | 8/2006 | Kaitaniemi | G06F 17/30575 709/203 |
| 2013/0304790 A1* | 11/2013 | Kimura | H04W 8/24 709/201 |
| 2016/0012517 A1* | 1/2016 | Woo | H04W 4/008 705/26.9 |

FOREIGN PATENT DOCUMENTS

| JP | 2003-099448 | 4/2003 |
| JP | 2004-530336 | 9/2004 |
| (Continued) | | |

OTHER PUBLICATIONS

"The World of 'Beacon', a Micro Location Technology" (pp. 1-6) from "How Can You Use Beacon? Beacon 101" (Jul. 6, 2015) Keyman's Net, http://www.keyman.or.jp/at/30007879/, and a partial English translation thereof.

*Primary Examiner* — Moustapha Diaby
(74) *Attorney, Agent, or Firm* — Oblon, McClelland, Maier & Neustadt, L.L.P.

(57) ABSTRACT

A communication system includes multiple beacon terminals located at a specific area, each beacon terminal being configured that transmits beacon data including identification information identifying the beacon terminal and area identification information identifying the specific area where the multiple beacon terminals are located, a server that stores contents for the multiple beacon terminals associated with the beacon data, and a mobile terminal including a receiver that receives the beacon data from at least one of the multiple beacon terminals and circuitry that determines whether or not the contents for the multiple beacon terminals associated with the received beacon data are stored in a memory of the mobile terminal to generate a determination result and acquires the contents for the multiple beacon terminals associated with the received beacon data from the server based on the determination result.

10 Claims, 9 Drawing Sheets

(51) Int. Cl.
*H04L 29/08* (2006.01)
*H04W 4/00* (2018.01)
*H04W 84/12* (2009.01)

(52) U.S. Cl.
CPC ...... *H04L 67/2842* (2013.01); *H04L 67/2857* (2013.01); *H04W 4/008* (2013.01); *H04W 84/12* (2013.01)

(56) References Cited

FOREIGN PATENT DOCUMENTS

| | | |
|---|---|---|
| JP | 2015-146855 | 8/2015 |
| WO | WO02/076113 A2 | 9/2002 |

* cited by examiner

COMMUNICATION SYSTEM, CONTENTS ACQUISITION METHOD, AND RECORDING MEDIUM STORING CONTENTS ACQUISITION PROGRAM

CROSS-REFERENCE TO RELATED APPLICATION

This patent application is based on and claims priority pursuant to 35 U.S.C. § 119(a) to Japanese Patent Application No. 2015-214899, filed on Oct. 30, 2015 in the Japan Patent Office, the entire disclosure of which is hereby incorporated by reference herein.

BACKGROUND

Technical Field

The present invention relates to a communication system, a contents acquisition method, and a non-transitory recording medium storing a contents acquisition program.

Background Art

Positioning methods used in indoor environments where GPS radio waves do not reach are collectively referred to as indoor positioning technology. In a known system using the indoor positioning technology, multiple beacon terminals are located in a predetermined area. As each beacon terminal transmits a beacon ID (i.e., identification information of the beacon terminal), a mobile terminal, such as a smartphone, receives the beacon ID and reports the beacon ID to a server via a network. The server then transfers predetermined contents to the mobile terminal.

For example, in the known system, one or more beacon terminals are located in a shopping mall to present a way to various places to a user who owns the mobile terminal, or in front of exhibits in a museum to provide information on the exhibit to the mobile terminal carried by the user as the mobile terminal gets close to the exhibit.

SUMMARY

Example embodiments of the present invention provide a novel communication system that includes multiple beacon terminals located at a specific area, each beacon terminal being configured that transmits beacon data including identification information identifying the beacon terminal and area identification information identifying the specific area where the multiple beacon terminals are located, a server that stores contents for the multiple beacon terminals associated with the beacon data, and a mobile terminal including a receiver that receives the beacon data from at least one of the multiple beacon terminals and circuitry that determines whether or not the contents for the multiple beacon terminals associated with the received beacon data are stored in a memory of the mobile terminal to generate a determination result and acquires the contents for the multiple beacon terminals associated with the received beacon data from the server based on the determination result.

Further example embodiments of the present invention provide a contents acquisition method and a non-transitory recording medium storing a contents acquisition program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

Figure 1:
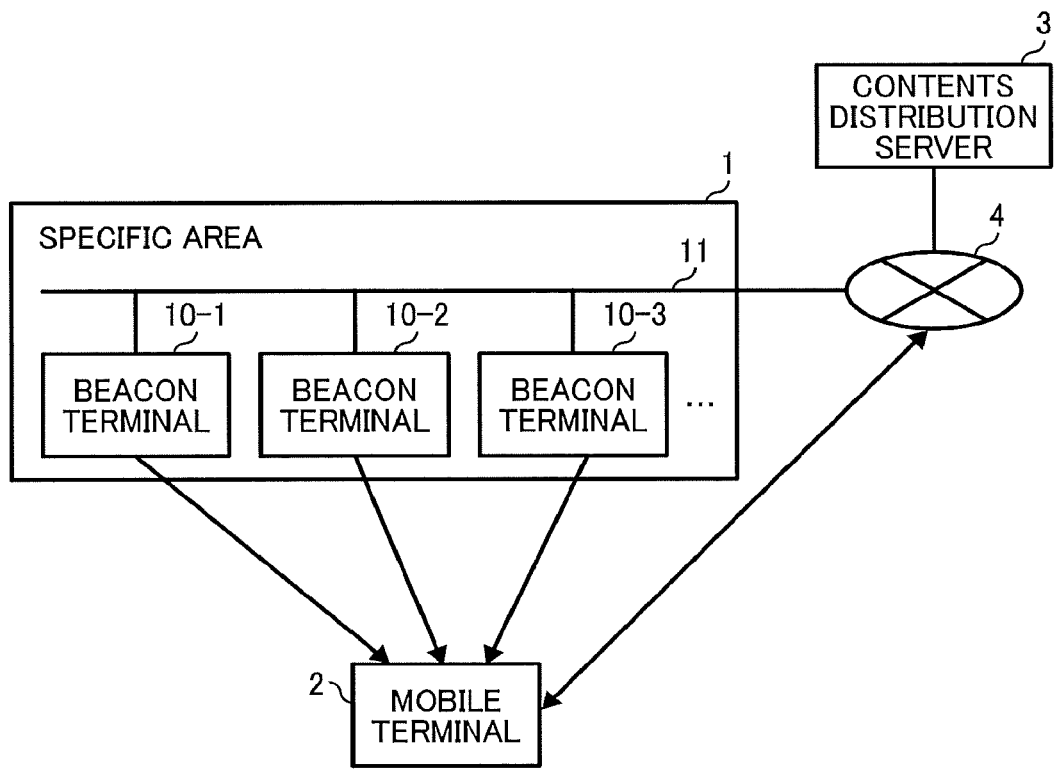
FIG. 1 is a diagram illustrating a configuration of a communication system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

Configuration of a Communication System

FIG. 1 is a diagram illustrating a configuration of a communication system in this embodiment.

The communication system in this embodiment includes multiple beacon terminals 10-1 to 10-3, a mobile terminal 2, and a contents distribution server 3, which reside on a network 4. The beacon terminals 10-1 to 10-3 are connected to the network 4 via a LAN 11.

A specific area 1 indicates not only a physical area such as a shopping mall, a building, a station yard, and a floor etc. but also a conceptual area such as a virtual area. For example, even if beacon terminals with different applications (i.e., one is for clerks and the other is for customers) are located in a same physical area, each conceptual area is designated to each beacon terminal having a specific application as a specific area 1.

The beacon terminals 10-1 to 10-3 transfer beacon information including a beacon ID as identification information specific to each beacon terminal using Bluetooth Low Energy (BLE) and sonic wave etc. Since the configurations of the beacon terminals 10-1 to 10-3 are the same, they are collectively referred to as the beacon terminal 10 in the description below unless they need to be distinguished from one another.

The mobile terminal 2 is a portable information communication terminal such as a smartphone (i.e., a highly functional mobile phone) and a tablet terminal etc. In this case, the mobile terminal 2 includes a function of receiving the beacon information from the beacon terminal 10 and a function of communicating with the contents distribution server 3 via the network 4 using Wi-Fi, 3G, and LTE etc.

The contents distribution server 3 manages contents such as the beacon information, position information, and map information of the beacon terminals 10-1 to 10-3 and distributes the contents to the mobile terminal 2 in response to a request from the mobile terminal 2.

Next, hardware configurations of the beacon terminal 10, the mobile terminal 2, and the contents distribution server 3 are described below.

Hardware Configuration of the Beacon Terminal

Figure 2:
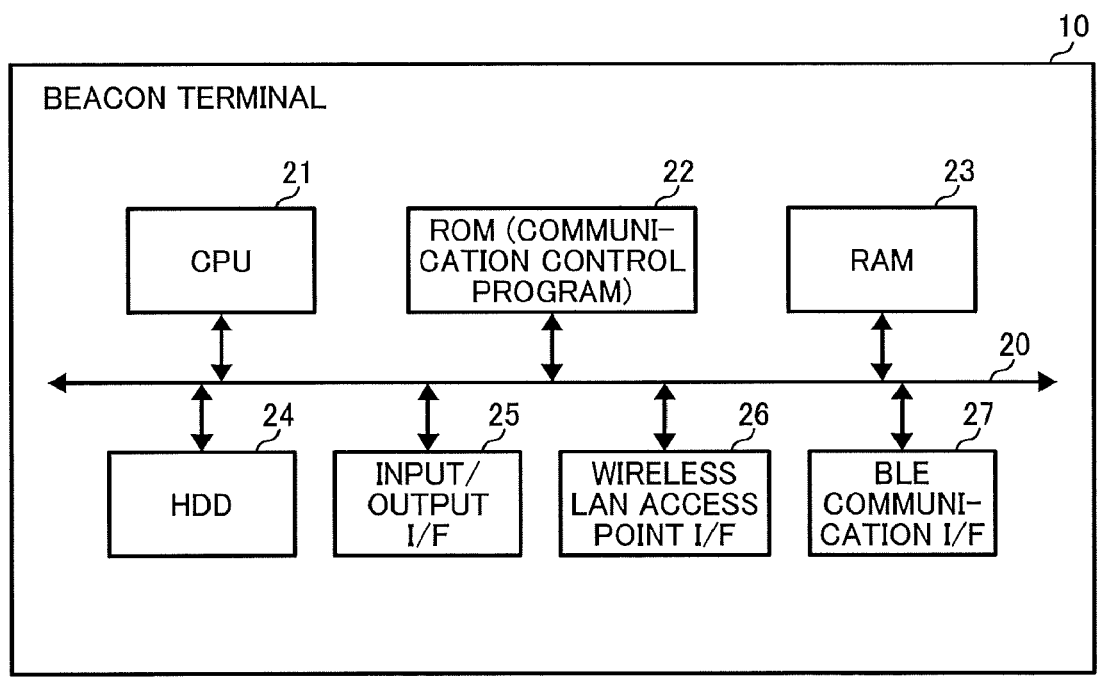
FIG. 2 is a block diagram illustrating a hardware configuration of a beacon terminal in FIG. 1 as an embodiment of the present invention.

FIG. 2 is a block diagram illustrating a hardware configuration of the beacon terminal 10 in FIG. 1 in this embodiment.

The beacon terminal 10 includes a bus 20, and a Central Processing Unit (CPU) 21, Read Only Memory (ROM) 22, Random Access Memory (RAM) 23, hard disk drive (HDD) 24, input/output interface (I/F) 25, a wireless LAN access point (AP) I/F 26, and a BLE communication I/F 27, which are connected to the bus 20.

The CPU 21 is a processor that controls whole beacon terminal 10. The ROM 22 is a memory that stores a communication control program and fixed data. The RAM 23 is a memory that functions as a work area when the CPU 21 performs various operations.

The HDD 24 is a storage medium for storing large-sized data and programs as needed. The input/output I/F 25 connects to a removable storage medium such as a USB memory or a SD memory etc.

The wireless LAN AP 26 provides communication via the LAN 11 using Wi-Fi. The BLE communication I/F 27 performs wireless communication using BLE and transmits the beacon information in this embodiment.

Hardware Configuration of the Mobile Terminal

Figure 3:
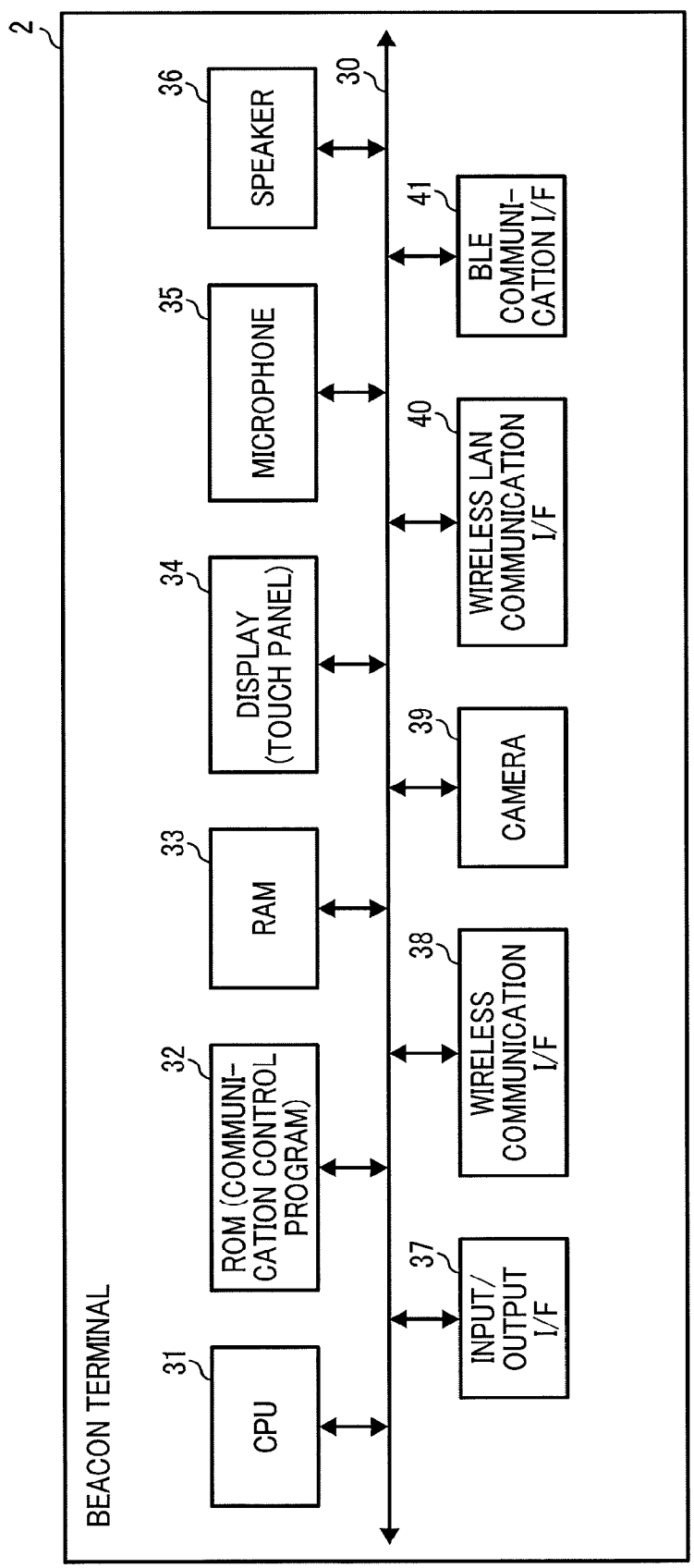
FIG. 3 is a block diagram illustrating a hardware configuration of a mobile terminal in FIG. 1 as an embodiment of the present invention.

FIG. 3 is a block diagram illustrating a hardware configuration of the mobile terminal 2 in FIG. 1 in this embodiment.

The mobile terminal 2 includes a bus 30, and a CPU 31, ROM 32, RAM 33, display 34, microphone 35, speaker 36, input/output OF 37, wireless communication OF 38, camera 39, wireless LAN communication I/F 40, and BLE communication I/F 41, which are connected via the bus 30.

The CPU 31 is a processor that controls whole mobile terminal 2. The ROM 32 is a memory that stores a communication control program and fixed data. The RAM 33 is a memory that functions as a work area when the CPU 31 performs various operations.

The display 34 is a user interface including a liquid crystal display (LCD) and a touch panel on the LCD. The microphone 35 converts sounds collected around the mobile terminal 2 into electric signals for transmission. The speaker 36 converts audio signals transferred by the contents distribution server 3 and on-line mobile phones etc. into sounds to output the sounds.

The input/output I/F 37 connects to a removable storage medium such as a USB memory or a SD memory etc. The wireless communication I/F 38 performs wireless communication via the network 4 using 3G and LTE etc.

The camera 39 is an image input interface for capturing still images and movies. The wireless LAN communication IN 40 performs wireless communication using Wi-Fi. The BLE communication I/F 27 performs wireless communication using BLE and transmits the beacon information in this embodiment.

Hardware Configuration of the Contents Distribution Server

Figure 4:
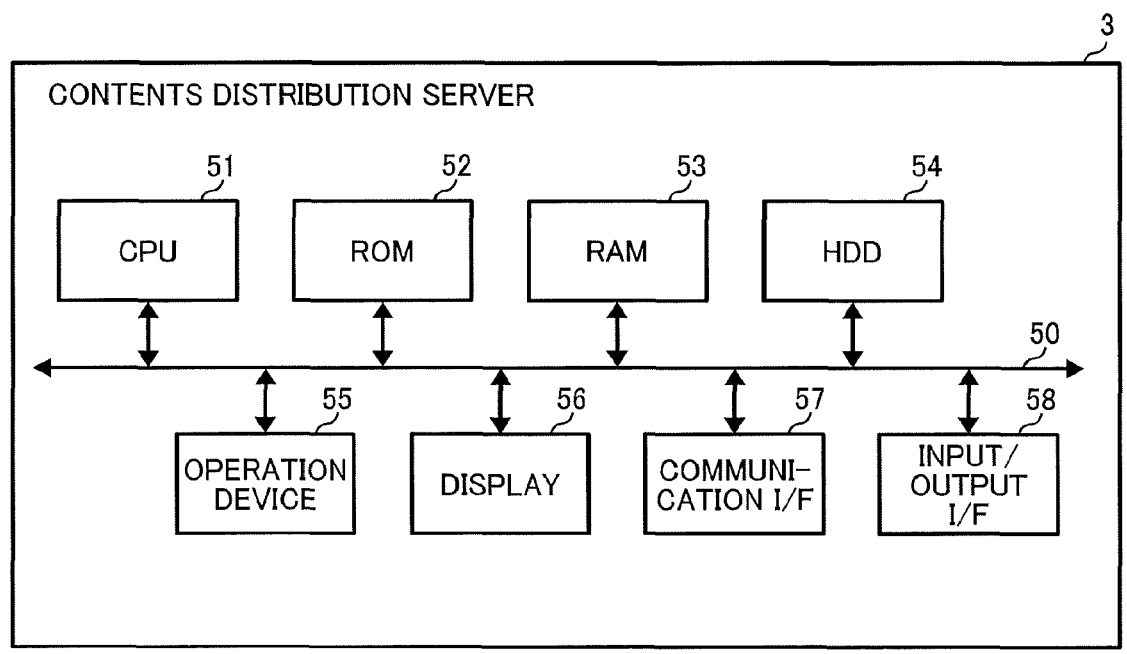
FIG. 4 is a block diagram illustrating a hardware configuration of a contents distribution server in FIG. 1 as an embodiment of the present invention.

FIG. 4 is a block diagram illustrating a hardware configuration of a contents distribution server in FIG. 1 in this embodiment.

The contents distribution server 3 is constructed by a computer and includes a bus 50, and a CPU 51, ROM 52, RAM 53, HDD 54, operation device 55, display 56, communication I/F 57, and input/output I/F 58, which are connected via the bus 50.

The CPU 51 is a processor that controls whole contents distribution server 3. The ROM 52 is a memory that stores BIOS and fixed data etc. The RAM 53 is a memory that functions as a work area when the CPU 51 performs various operations. The HDD 54 is an external storage device that stores data such as contents and programs such as a contents distribution program and an operating system etc.

The operation device 55 includes a keyboard and a mouse to allow a user to operate the contents distribution server 3. The display 56 displays, to the user, an operating status of the contents distribution server 3 and information input from the operation device 55 etc.

The communication I/F 57 is a network interface card (NIC) etc. for communicating with the mobile device 2 and the beacon terminal 10 via the network 4. The input/output I/F 58 connects to a storage medium such as a removable storage medium like a CD-ROM, DVD-ROM, or USB memory etc.

Next, functional configurations of the beacon terminal 10, the mobile terminal 2, and the contents distribution server 3 are described below.

Functional Configuration of the Beacon Terminal

Figure 5:
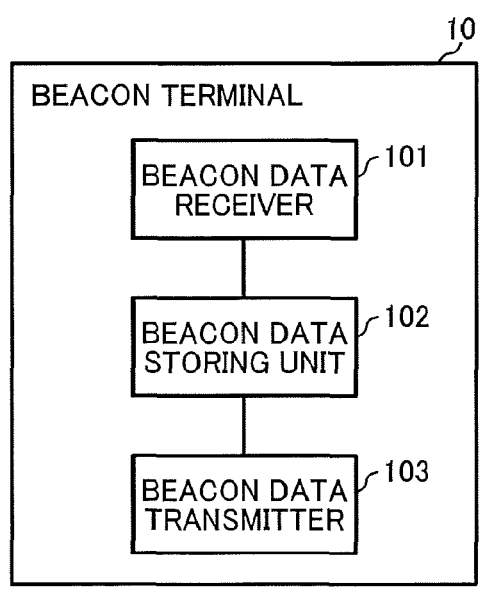
FIG. 5 is a diagram illustrating functional blocks of the beacon terminal in FIG. 1 as an embodiment of the present invention.

FIG. 5 is a diagram illustrating functional blocks of the beacon terminal 10 in FIG. 1 in this embodiment.

As illustrated in FIG. 5, the beacon terminal 10 includes a beacon data receiver 101, a beacon data storing unit 102, and a beacon data transmitter 103.

The beacon data receiver 101 receives beacon data from the contents distribution server 3. The beacon data storing unit 102 stores the beacon data received by the beacon data receiver 101. It should be noted that beacon data stored in a removable storage medium may be acquired via the input/output I/F 25.

The beacon data transmitter 103 transmits the beacon data stored in the beacon data storing unit 102.

Table 1 illustrates an example of the beacon data. In this case, the beacon data includes a beacon ID as identification information specific to a beacon terminal and an area ID as identification information specific to an area.

TABLE 1

| Area ID | Beacon ID |
|---------|-----------|
| A       | AAAA      |

First Example of a Functional Configuration of the Mobile Terminal

Figure 6:
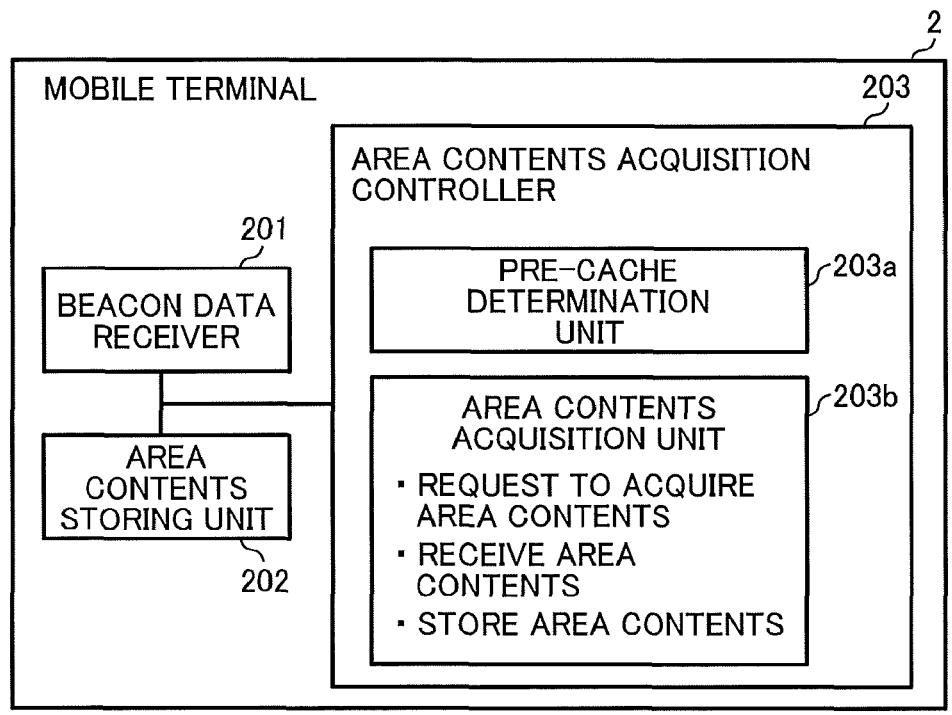
FIG. 6 is a diagram illustrating functional blocks of the mobile terminal in FIG. 1 as an embodiment of the present invention.

FIG. 6 is a diagram illustrating functional blocks of the mobile terminal 2 in FIG. 1 in this embodiment.

The mobile terminal 2 includes a beacon data receiver 201, an area contents storing unit 202, and an area contents acquisition controller 203.

The beacon data receiver 201 receives the beacon data transmit by the beacon data transmitter 103 in the beacon terminal 10 and sends a request to acquire beacon data (i.e., the area ID and beacon ID) and beacon contents specified by the beacon ID to the area contents acquisition controller 203.

Table 2 illustrates an example of the beacon contents. In this case, the beacon contents include the beacon ID, location latitude, location longitude, and URL of an area map. The beacon contents are contents associated with the beacon ID.

TABLE 2

| Beacon ID | Location latitude | Location longitude | Area map URL |
|-----------|-------------------|--------------------|--------------|
| AAAA      | 1111              | 1111               | http://aaa1.co.jp |

The area contents storing unit 202 stores the area contents acquired from the contents distribution server 3 by the area contents acquisition controller 203.

In response to the request to acquire the beacon contents transmitted by the beacon data receiver 201, the area contents acquisition controller 203 acquires the area contents specified by the area ID sent along with the acquisition request.

Table 3 illustrates an example of the area contents. In this case, the area contents include the area ID, beacon ID, location latitude, location longitude, and URL of an area map.

TABLE 3

| Area ID | Beacon ID | Location latitude | Location longitude | Area map URL |
|---------|-----------|-------------------|--------------------|--------------|
| A       | AAAA      | 1111              | 1111               | http://aaa1.co.jp |
| A       | BBBB      | 2222              | 2222               | http://aaa2.co.jp |

TABLE 3-continued

| Area ID | Beacon ID | Location latitude | Location longitude | Area map URL |
|---------|-----------|-------------------|--------------------|--------------|
| A       | CCCC      | 3333              | 3333               | http://aaa3.co.jp |
| A       | DDDD      | 4444              | 4444               | http://aaa4.co.jp |

As illustrated in Table 3, the area contents includes the beacon contents for each of the multiple beacon terminals located in a same specific area (i.e., those beacon terminals have a common area ID), with these beacon contents having a common area ID. The area contents are contents associated with the beacon data (i.e., the beacon ID and the area ID).

The area contents acquisition controller 203 includes a pre-cache determination unit (determining unit) 203*a* and an area contents acquisition unit 203*b*. The pre-cache determination unit 203*a* determines whether or not the area contents specified by the area ID sent by the beacon data receiver 201 is stored in the area contents storing unit 202 (i.e., whether or not the area contents is cached) and sends the determination result to the area contents acquisition unit 203*b*.

The area contents acquisition unit 203*b* includes a function of requesting to acquire area contents, a function of receiving area contents, and a function of storing area contents. The function of requesting to acquire area contents is a function that issues (transfers) a request to acquire area contents to the area contents storing unit 202 or the contents distribution server 3. The function of receiving area contents is a function that receives area contents transferred by the contents distribution server 3 or the area contents storing unit 202 in response to the acquisition request. The function of storing area contents is a function that stores area contents transferred by the contents distribution server 3 in the area contents storing unit 202.

If the determination result by the pre-cache determination unit 203*a* is "not-cached", the area contents are acquired from the contents distribution server 3. If the determination result by the pre-cache determination unit 203*a* is "cached", the area contents are acquired from the area contents storing unit 202. As a result, the mobile terminal 2 may use the beacon contents requested to acquire by the beacon data receiver 201.

Functional Configuration of the Contents Distribution Server

Figure 7:
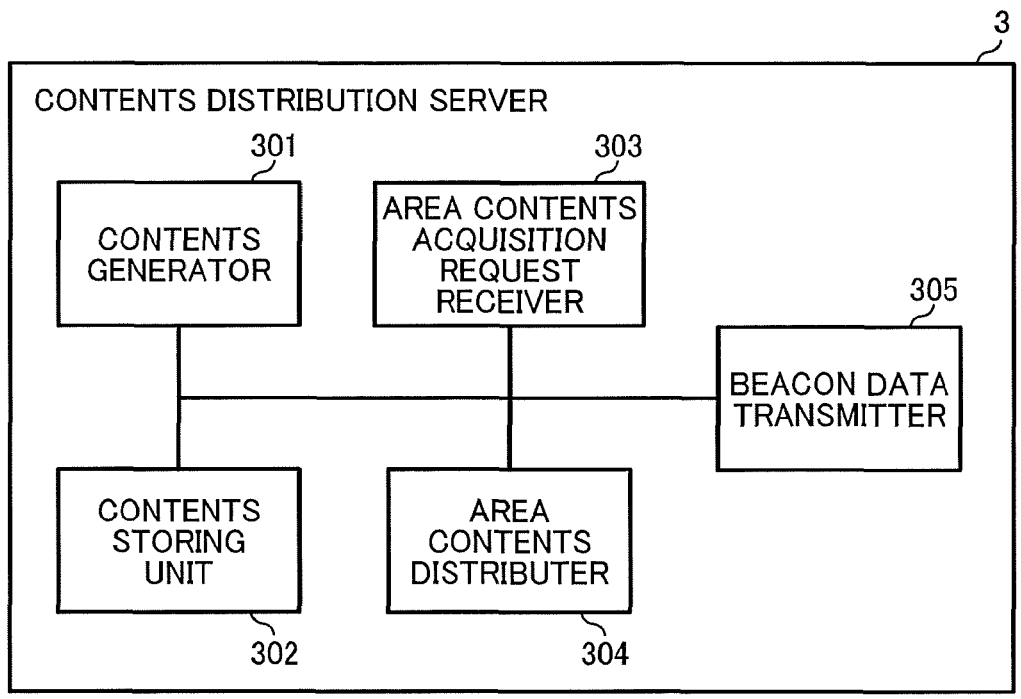
FIG. 7 is a diagram illustrating functional blocks of the contents distribution server in FIG. 1 as an embodiment of the present invention.

FIG. 7 is a diagram illustrating functional blocks of the contents distribution server 3 in FIG. 1 in this embodiment.

The contents distribution server 3 includes a contents generator 301, a contents storing unit 302, an area contents (acquisition) request receiver 303, an area contents distributor 304, and a beacon data transmitter 305.

The contents generator 301 generates area contents and beacon data. The contents storing unit 302 stores the area contents and beacon data.

The request to acquire area contents request receiver 303 receives a request to acquire area contents transferred by the mobile terminal 2. The area contents distributor 304 distributes area contents to the mobile terminal 2 in response to the acquisition request. The beacon data transmitter 305 transmits beacon data to the beacon terminal 10.

Next, an operation of the communication system in FIG. 1 is described below.

First Example Operation of the Communication System

Figure 8:
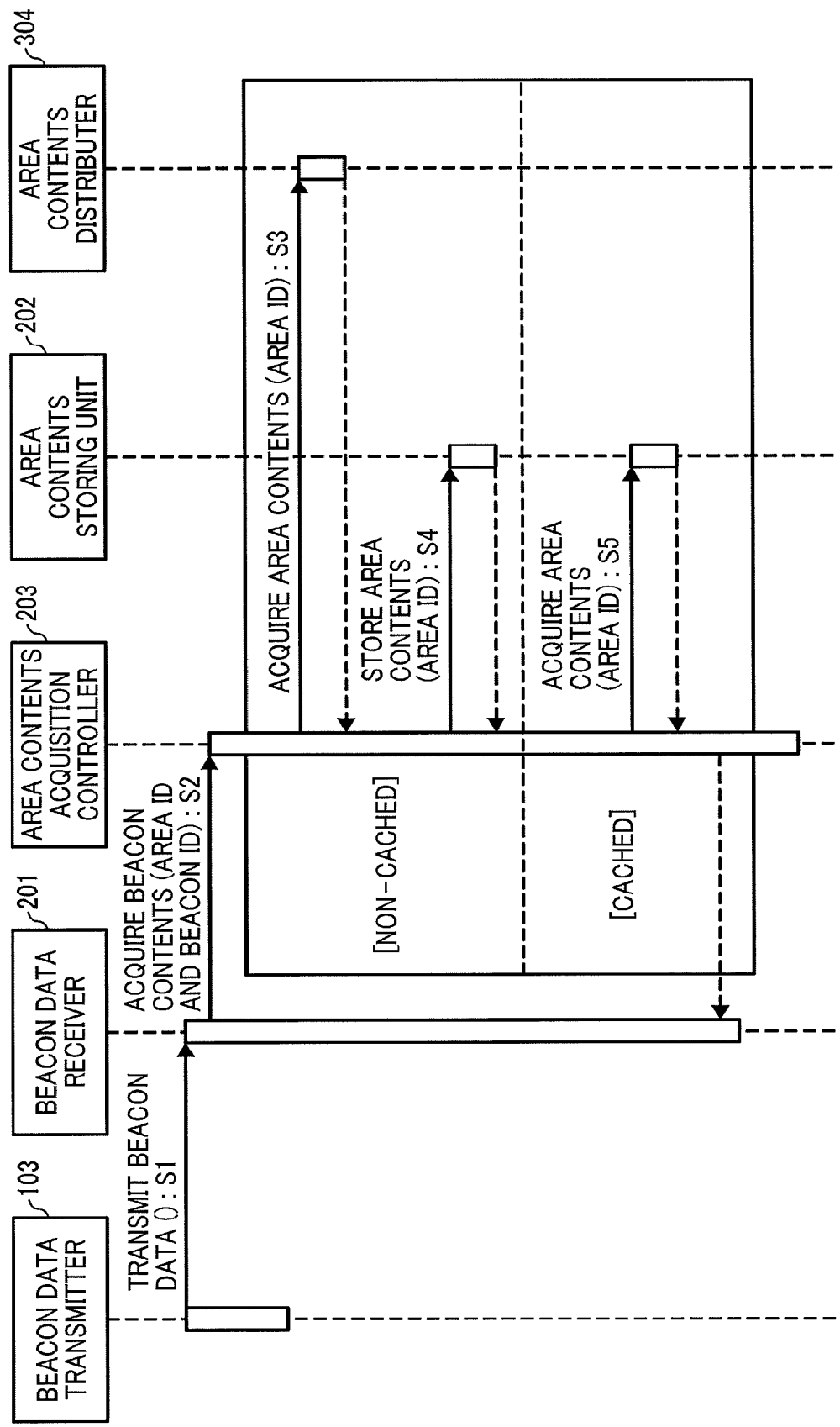
FIG. 8 is a sequential diagram illustrating an operation of the communication system in FIG. 1 as an embodiment of the present invention.

FIG. 8 is a sequential diagram illustrating an operation of the communication system in FIG. 1 in this embodiment. The operation is performed by the beacon terminal 10 in FIG. 5, the mobile device 2 in FIG. 6, and the contents distribution server 3 in FIG. 7.

The beacon data transmitter 103 always or periodically transmits beacon data (i.e., an area ID and beacon ID). As the mobile terminal 2 enters within a certain distance from the beacon terminal 10, the beacon data receiver 201 starts receiving the beacon data in S1.

The beacon data receiver 201 sends to the area contents acquisition controller 203, the received beacon data (i.e., the area ID and beacon ID), and a request for beacon contents specified by the beacon ID in S2.

The area contents acquisition controller 203 determines whether or not area contents specified by the area ID sent by the beacon data receiver 201 is stored in the area contents storing unit 202 (i.e., whether or not the area contents are cached). For example, if the area ID is A, it is determined whether or not the area contents assigned with the area ID "A" are stored as illustrated in Table 3.

If the area contents are not cached, the mobile terminal 2 sends a request to acquire area contents to the area contents distributor 304 of the contents distribution server 3 in S3. The request to acquire area contents includes the area ID. The area contents distributor 304 then sends area contents corresponding to the received area ID, to the mobile terminal 2.

The area contents acquisition controller 203 acquires the area contents transferred by the area contents distributor 304 in response to the request to acquire area contents and stores the area contents in the area contents storing unit 202 in S4. If the area ID is A, area contents illustrated in Table 3 is acquired.

By contrast, if the area contents stored in the area contents storing unit 202 is the area contents illustrated in Table 3 or Table 4, for example, it is determined that the area contents are cached.

TABLE 4

| Area ID | Beacon ID | Location latitude | Location longitude | Area map URL |
|---|---|---|---|---|
| A | AAAA | 1111 | 1111 | http://aaa1.co.jp |
| A | BBBB | 2222 | 2222 | http://aaa2.co.jp |
| A | CCCC | 3333 | 3333 | http://aaa3.co.jp |
| A | DDDD | 4444 | 4444 | http://aaa4.co.jp |
| B | EEEE | 5555 | 5555 | http://bbb5.co.jp |
| B | FFFF | 6666 | 6666 | http://bbb6.co.jp |
| B | GGGG | 7777 | 7777 | http://bbb7.co.jp |

The area contents acquisition controller 203 acquires area contents illustrated in Table 3 from the area contents storing unit 202 in S5. In case the area contents of Table 4 is stored, only the area contents assigned with the area ID A is acquired.

The operation in FIG. 8 ends after the area contents acquisition controller 203 sends a response indicating completion of the acquisition process to the beacon data receiver 201 in response to the request received at S2. The mobile terminal 2 can then use the beacon contents, which is specified by the beacon ID transferred from the beacon data transmitter 103.

As described above, in this first example operation of the communication system in this embodiment, when the mobile terminal 2 receives the beacon data from any one of the beacon terminals located at a specific area 1, the mobile terminal 2 acquires the area contents including beacon contents of all beacon terminals located at the specific area 1. This improves responsiveness in receiving contents at the mobile terminal, while allowing operation even when network communication is shut down or reducing loads on a network of the system.

Second Example of a Functional Configuration of the Mobile Terminal

Figure 9:
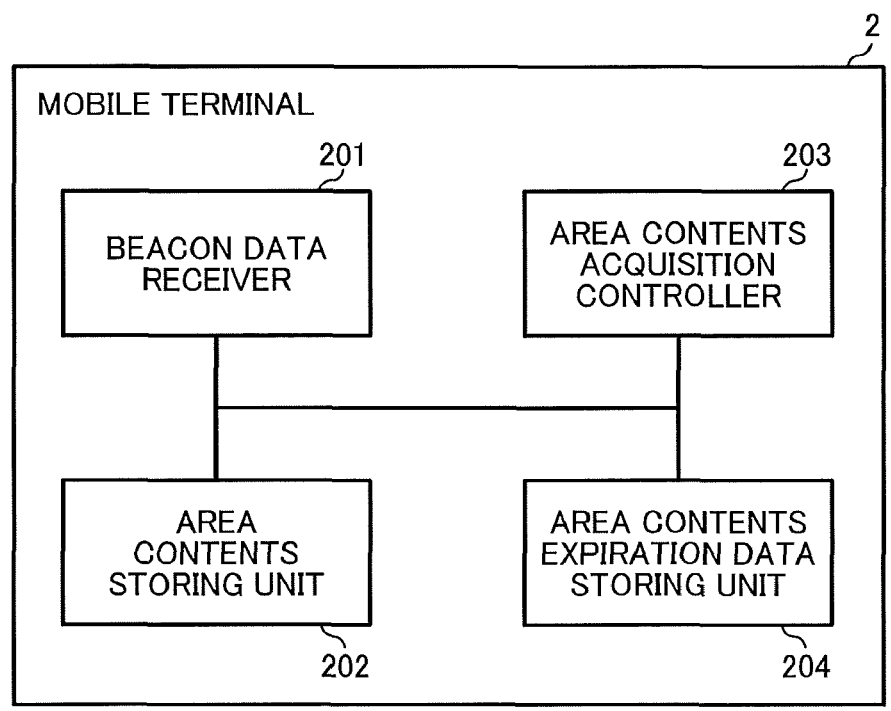
FIG. 9 is a diagram illustrating functional blocks of the mobile terminal in FIG. 1 as an embodiment of the present invention.

FIG. 9 is a diagram illustrating functional blocks of the mobile terminal 2 in FIG. 1 in this embodiment. In FIG. 9, same symbols as in FIG. 6 (i.e., the first example functional configuration of the mobile terminal 2) are assigned to same parts and corresponding parts in FIG. 9.

The mobile terminal 2 includes a beacon data receiver 201, an area contents storing unit 202, an area contents acquisition controller 203, and an area contents expiration data storing unit 204. That is, the data specifying expiration of area contents expiration data storing unit 204 in the second example functional configuration of the mobile terminal 2 is added to the first example functional configuration of the mobile terminal 2.

In the second example, the area contents, as illustrated in Table 5, additionally has "update date/time" as information on update time compared to the area contents in Table 3.

TABLE 5

| Area ID | Beacon ID | Location latitude | Location longitude | Area map URL | Update date/time |
|---|---|---|---|---|---|
| A | AAAA | 1111 | 1111 | http://aaa1.co.jp | 16:30, Sep. 11, 2015 |
| A | BBBB | 2222 | 2222 | http://aaa2.co.jp | 16:30, Sep. 11, 2015 |
| A | CCCC | 3333 | 3333 | http://aaa3.co.jp | 16:30, Sep. 11, 2015 |
| A | DDDD | 4444 | 4444 | http://aaa4.co.jp | 16:30, Sep. 11, 2015 |

Data indicating expiration of area contents ("area contents expiration data") stored in the area contents expiration data storing unit 204 is used as a standard for determining whether or not new area contents are to be acquired if the area contents stored in the area contents storing unit 202 become old. The data specifying expiration of area contents may be configured by user operation.

For example, if the area contents expiration data is set to 24 hours, when 24 hours has passed from the update date/time of the area contents stored in the area contents storing unit 202 (i.e., after 16:30 on Sep. 12, 2015 in Table 5), the area contents acquisition controller 203 send the request to acquire area contents to the contents distribution server 3.

Second Example Operation of the Communication System

Figure 10:
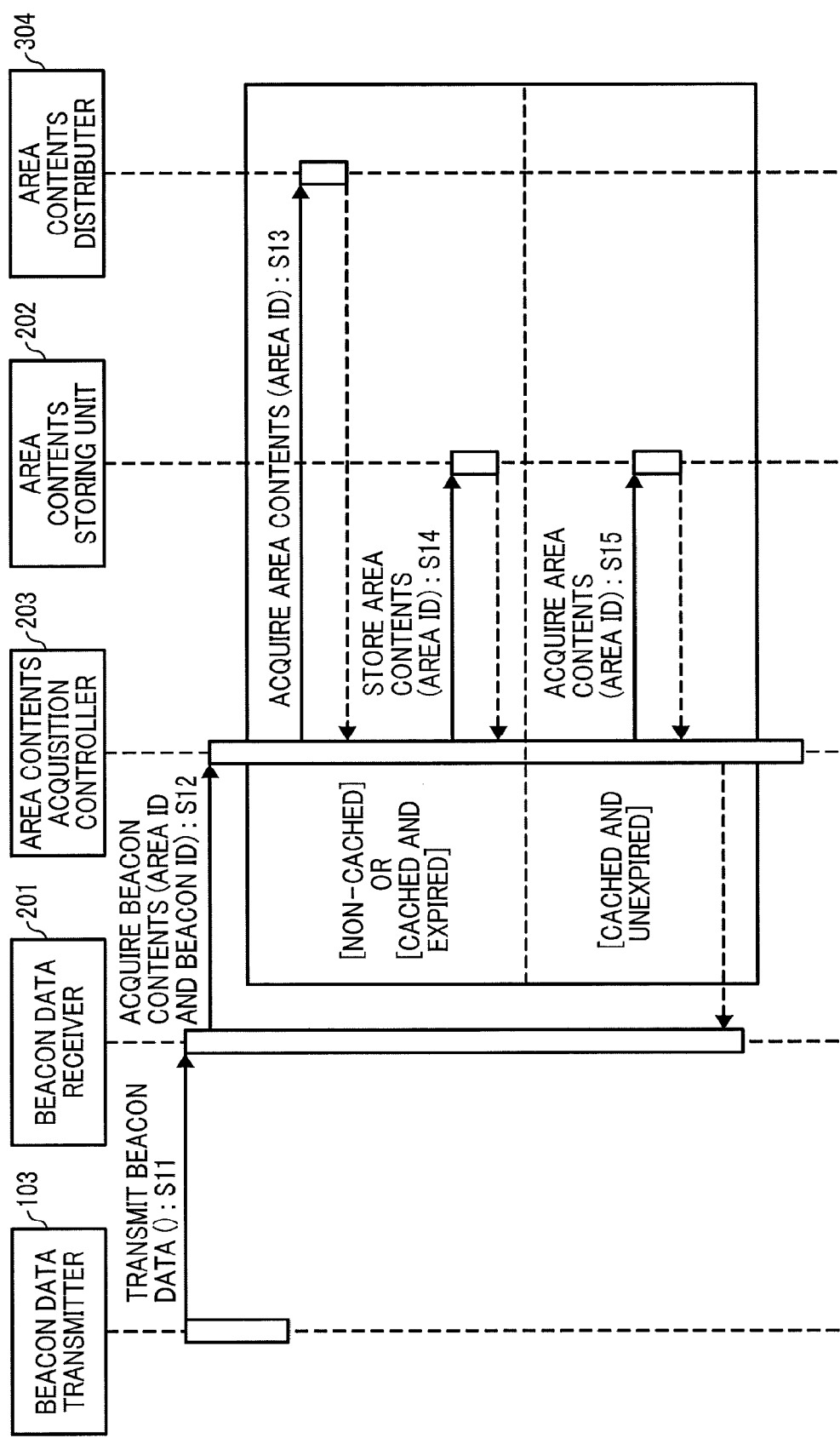
FIG. 10 is a sequential diagram illustrating an operation of the communication system in FIG. 1 as an embodiment of the present invention.

FIG. 10 is a sequential diagram illustrating an operation of the communication system in FIG. 1 in this embodiment. The operation is performed by the beacon terminal 10 in FIG. 5, the mobile device 2 in FIG. 9, and the contents distribution server 3 in FIG. 7.

In FIG. 10, steps S11 and S12 are performed in a substantially similar manner as descried above referring to steps S1 and S2 in FIG. 8. Therefore, detailed description for those steps is omitted. In the next step, the area contents acquisition controller 203 determines whether or not the area contents are cached and the cached area contents are expired.

If the area contents are not cached or the area contents are cached but expired, a request to acquire area contents is transferred to the area contents distributor 304 in S13. If the area ID is "A" and the area contents in Table 5 are not cached or the area contents are cached but expired, the request to acquire area contents is transferred.

In response to the request to acquire area contents, the area contents acquisition controller 203 acquires area contents transferred by the area contents distributor 304 and stores the area contents in the area contents storing unit 202 in S14. If the area ID corresponds to A, area contents illustrated in Table 5 is acquired.

By contrast, if the area contents are cached and not expired, the area contents acquisition controller 203 acquires area contents from the area contents storing unit 202 in S15.

The operation in FIG. 10 ends after the area contents acquisition controller 203 sends a response indicating completion of the acquisition process to the beacon data receiver 201 in response to the request received at S12. The mobile terminal 2 can then use the beacon contents, which is specified by the beacon ID transferred from the beacon data transmitter 103.

Table 6 illustrates an example of area contents stored in the area contents storing unit 202.

TABLE 6

| Area ID | Beacon ID | Location latitude | Location longitude | Area map URL | Update date/time |
|---------|-----------|-------------------|--------------------|--------------| -----------------|
| A | AAAA | 1111 | 1111 | http://aaa1.co.jp | 16:30, Sep. 11, 2015 |
| A | BBBB | 2222 | 2222 | http://aaa2.co.jp | 16:30, Sep. 11, 2015 |
| A | CCCC | 3333 | 3333 | http://aaa3.co.jp | 16:30, Sep. 11, 2015 |
| A | DDDD | 4444 | 4444 | http://aaa4.co.jp | 16:30, Sep. 11, 2015 |
| B | EEEE | 5555 | 5555 | http://bbb5.co.jp | 10:10, Sep. 11, 2015 |
| B | FFFF | 6666 | 6666 | http://bbb6.co.jp | 10:10, Sep. 11, 2015 |
| B | GGGG | 7777 | 7777 | http://bbb7.co.jp | 10:10, Sep. 11, 2015 |

As described above, in the second example operation of the communication system in this embodiment, area contents are acquired if the area contents are not cached or cached but expired. As a result, area contents may be acquired as needed, for example, to determine whether a layout change at a specific area needs to be reviewed.

Third Example of a Functional Configuration of the Mobile Terminal

Figure 11:
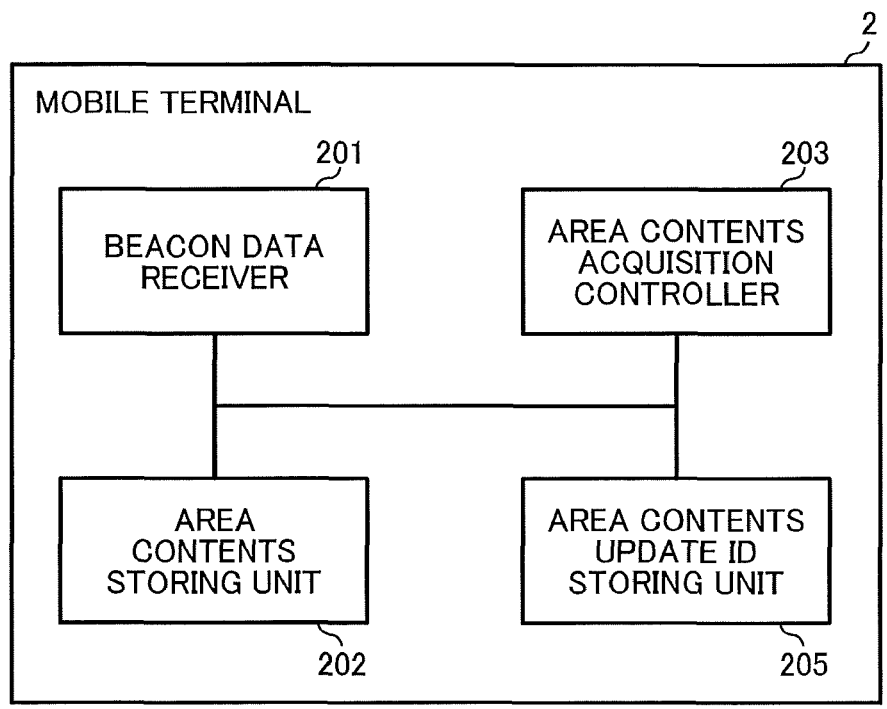
FIG. 11 is a diagram illustrating functional blocks of the mobile terminal in FIG. 1 as an embodiment of the present invention.

FIG. 11 is a diagram illustrating functional blocks of the mobile terminal 2 in FIG. 1 in this embodiment. In FIG. 9, same symbols as in FIG. 6 (i.e., the first example functional configuration of the mobile terminal 2) are assigned to same parts and corresponding parts in FIG. 9.

The mobile terminal 2 includes a beacon data receiver 201, an area contents storing unit 202, an area contents acquisition controller 203, and an area contents update ID storing unit 205. That is, the area contents update ID storing unit 205 in the third example functional configuration of the mobile terminal 2 is added to the first example functional configuration of the mobile terminal 2.

In the third example, for example, as illustrated in Table 7 below, "update flag" and "update ID" as update data for area contents are added to the beacon data in Table 1.

TABLE 7

| Area ID | Beacon ID | Update flag | Update ID |
|---------|-----------|-------------|-----------|
| A | AAAA | True | 09142015 |

Here, "the update flag" is data indicating whether or not area contents of an area specified by "the area ID" in the beacon data (i.e., an area whose area ID is "A" in this case) is updated (i.e., true or false). In addition, "the update ID" is identification information for uniquely identifying the update (i.e., update date in this case).

The update flag and update ID are transferred, with administrator operation, from the beacon data transmitter 305 in the contents distribution server 3 (in FIG. 7) to the beacon data receiver 101 in the beacon terminal 10 (in FIG. 5) via the network 4. The update flag and update ID are then stored in the beacon data storing unit 102.

Third Example Operation of the Communication System

Figure 12:
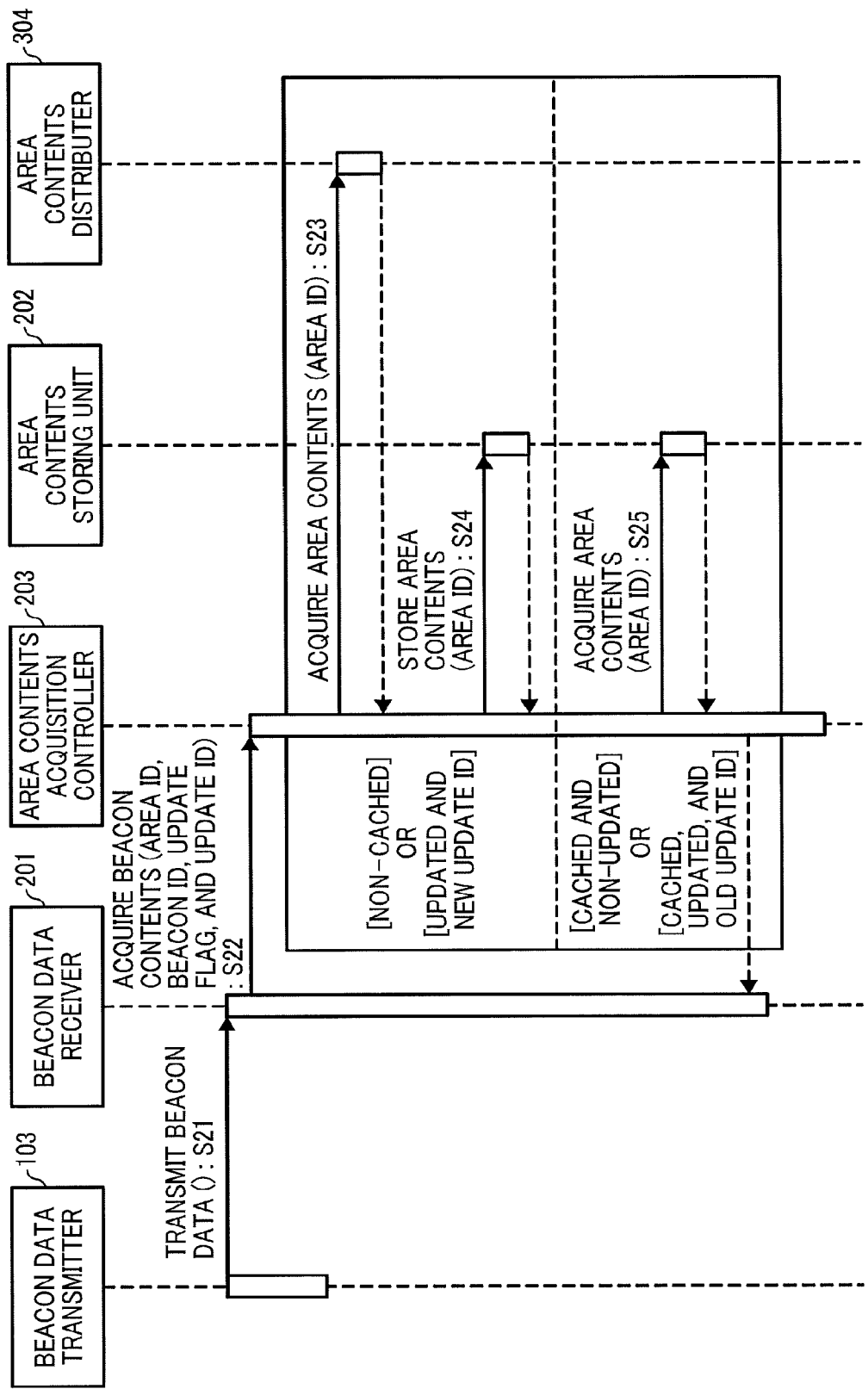
FIG. 12 is a sequential diagram illustrating an operation of the communication system in FIG. 1 as an embodiment of the present invention.

FIG. 12 is a sequential diagram illustrating an operation of the communication system in FIG. 1 in this embodiment. The operation is performed by the beacon terminal 10 in FIG. 5, the mobile device 2 in FIG. 11, and the contents distribution server 3 in FIG. 7.

In FIG. 12, step S21 is performed in a substantially similar manner as described above referring to step S1 in FIG. 8. Therefore, detailed description for this step S21 is omitted. In the next step S22, the beacon data receiver 201 requests the area contents acquisition controller 203 to acquire the beacon data (i.e., the area ID, beacon ID, update flag, and update ID) and beacon contents specified by the beacon ID.

In the next step, the area contents acquisition controller 203 determines whether or not the data (area contents) is cached, the cached data is updated, and the update ID is new. Here, whether the update ID is new or not is determined based on a comparison between the update ID of the beacon data and the update ID stored in the area contents update ID storing unit 205.

If "the area contents are not cached" or "the area contents are cached, updated, and the update ID is new", a request to acquire area contents is transferred to the area contents distributor 304 in S23.

The area contents acquisition controller 203 acquires the area contents transferred by the area contents distributor 304 in response to the request to acquire area contents and stores the area contents in the area contents storing unit 202 in S24. In this case, the update ID reported by the beacon data receiver 201 is stored in the area contents update ID storing unit 205 as a latest update ID.

By contrast, if "the area contents are cached and not updated" or "the area contents are cached, updated, and the update ID is not new", the area contents acquisition controller 203 acquires area contents from the area contents storing unit 202.

The operation in FIG. 12 ends after the area contents acquisition controller 203 sends a response indicating completion of the acquisition process to the beacon data receiver 201 in response to the request received at S22. The mobile terminal 2 can then use the beacon contents, which is specified by the beacon ID transferred from the beacon data transmitter 103.

The area contents stored in S24 or the area contents stored in the area contents storing unit 202 are the same as in the case of the first example (described before with reference to Tables 3 and 4).

As described above, in the third example operation of the communication system in this embodiment, area contents are acquired if the requested area contents are not stored or the stored area contents are not the latest. This prevents the system from acquiring area contents when it is not necessary.

In the embodiments described above, the system that includes multiple beacon terminals located in a specific area, the mobile terminals that receives identification information of the beacon terminal transmitted by the beacon terminal, and the server that distributes contents to the mobile terminal based on the identification information of the beacon terminal sent by the mobile terminal is provided. The system may improve responsiveness in receiving contents at the mobile terminal, while allowing operation even when network communication is shut down or reducing loads on a network of the system.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

In the embodiments described above, a novel image forming apparatus that may reduce a burden on the administrator and deterring users from transferring information to the other apparatus is provided.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A communication system, comprising:
   multiple beacon terminals located at a specific area, each beacon terminal being configured to transmit beacon data including identification information identifying the beacon terminal and area identification information identifying the specific area where the multiple beacon terminals are located;
   a server to store contents for the multiple beacon terminals associated with the beacon data; and
   a mobile terminal including:
   a receiver to receive the beacon data from at least one of the multiple beacon terminals when the mobile terminal enters the specific area; and
   circuitry to:
   after the mobile terminal enters the specific area, determine whether or not the contents for the multiple beacon terminals associated with the received area identification information included in the beacon data are stored in a memory of the mobile terminal to generate a determination result; and
   acquire all of the contents for the multiple beacon terminals associated with the received area identification information included in the beacon data from the server based on the determination result and store the contents for the multiple beacon terminals, each associated with the area identification information and specified separately by the identification information identifying each beacon terminal, in the memory,
   wherein the mobile terminal is configured to use the acquired contents after they are stored in the memory.

2. The communication system according to claim 1, wherein the circuitry of the mobile terminal acquires the contents from the server if the determination result indicates that the contents are not stored in the memory.

3. The communication system according to claim 1, wherein the contents for the multiple beacon terminals include information on update date and time when the contents are updated, and the circuitry acquires the contents based on the information on update date and time in addition to the determination result.

4. The communication system according to claim 1, wherein the beacon data includes update information indicating whether or not the contents for the multiple beacon terminals in the specific area are updated, and update identification information identifying the update, and the circuitry acquires the contents for the multiple terminals based on the update information in addition to the determination result.

5. The communication system according to claim 1, wherein the contents for the multiple beacon terminals include information on a specific geographical location of each beacon terminal.

6. The communication system according to claim 5, wherein the information on the specific geographical location includes a location latitude and a location longitude.

7. The communication system according to claim 5, wherein the information on the specific geographical location includes an internet address of an area map.

8. The communication system according to claim 1, wherein when the determination result indicates that the contents are stored in the memory, and contents for one or more beacon terminals located in another specific area are also stored in the memory, the mobile terminal only extracts and uses the contents for the multiple beacon terminals located in the specific area identified by the area identification information included in the received beacon data.

9. A method, implemented by a mobile terminal, of acquiring contents, comprising:
   receiving, when the mobile terminal enters a specific area, beacon data from at least one of multiple beacon terminals, the multiple beacon terminals being located at the specific area, the beacon data including identification information identifying the beacon terminal and area identification information identifying the specific area where the multiple beacon terminals are located;

after the mobile terminal enters the specific area, determining whether or not the contents for the multiple beacon terminals associated with the received area identification information included in the beacon data are stored in a memory of the mobile terminal to generate a determination result;

acquiring all of the contents for the multiple beacon terminals associated with the received area identification information included in the beacon data from the server based on the determination result and storing the contents for the multiple beacon terminals, each associated with the area identification information and specified separately by the identification information identifying each beacon terminal, in the memory;

using the acquired contents after they are stored in the memory.

10. A non-transitory, computer-readable recording medium storing a program that, when executed by a mobile terminal, causes the mobile terminal to implement a method of acquiring contents, comprising:

receiving, when the mobile terminal enters a specific area, beacon data from at least one of multiple beacon terminals, the multiple beacon terminals being located at the specific area, the beacon data including identification information identifying the beacon terminal and area identification information identifying the specific area where the multiple beacon terminals are located;

after the mobile terminal enters the specific area, determining whether or not the contents for the multiple beacon terminals associated with the received area identification information included in the beacon data are stored in a memory of the mobile terminal to generate a determination result;

acquiring all of the contents for the multiple beacon terminals associated with the received area identification information included in the beacon data from the server based on the determination result and storing the contents for the multiple beacon terminals, each associated with the area identification information and specified separately by the identification information identifying each beacon terminal, in the memory;

using the acquired contents after they are stored in the memory.

* * * * *